Aug. 7, 1923.
O. A. WIRKKALA
1,464,161
LOGGING CHOKER RIGGING
Filed Feb. 23, 1922
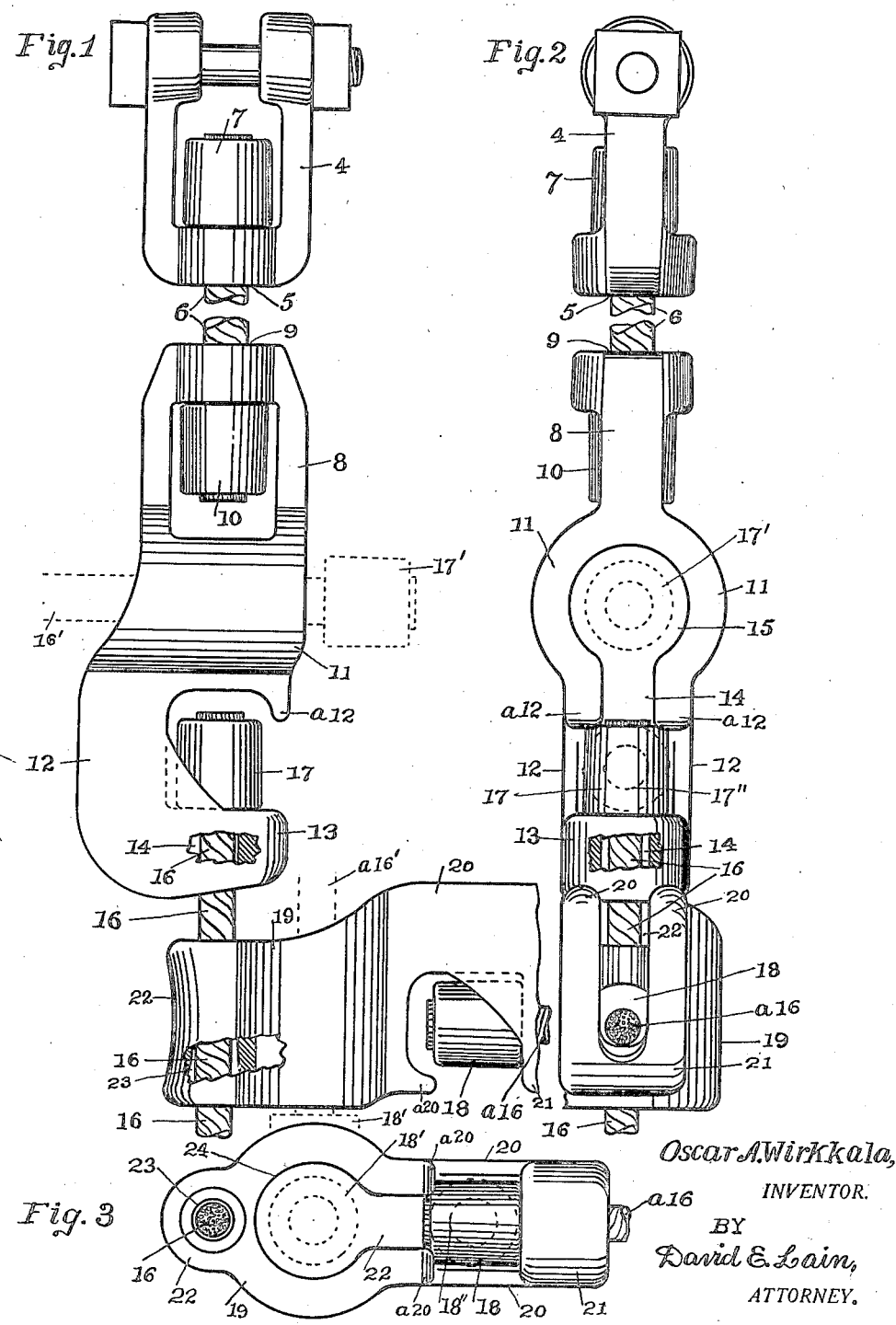
Oscar A. Wirkkala,
INVENTOR.
BY
David E. Lain,
ATTORNEY.

Patented Aug. 7, 1923.

1,464,161

UNITED STATES PATENT OFFICE.

OSCAR A. WIRKKALA, OF ROME, WASHINGTON.

LOGGING CHOKER RIGGING.

Application filed February 23, 1922. Serial No. 538,507.

*To all whom it may concern:*

Be it known that I, OSCAR A. WIRKKALA, a citizen of the United States, and a resident of the township of Rome, in the county of Whatcom and State of Washington, have invented a new and useful Logging Choker Rigging, of which the following is a specification.

My invention relates to improvements in choker rigging used in logging, and one of the objects of my improvements is to provide a choker rigging suited for mountain logging without danger of becoming disengaged from the logs when hauling the same. Another object of my invention is to provide a choker hook which may be easily disengaged from its cable when desired. Another object of my improvements is to use designs for the several fixtures of the rigging which can be made in steel castings, light, strong and relatively cheap. And another object of my improvements is to provide a choker rigging in which shorter lengths of choker cable can be used.

I attain these objects with the mechanism illustrated in the accompanying sheet of drawings in which Figure 1 is a side elevation of my choker rigging, Fig. 2 is a front elevation of Fig. 1 and Fig. 3 is a front elevation of the choker hook.

Similar characters refer to similar parts throughout. In Figs. 1 and 2 the end of the choker hook is broken away for lack of illustration space. Certain other parts are broken away for lack of space or to show other parts hidden thereby.

More particularly: The shank of the swivel clevis 4 has a swivel eye at 5 into which is inserted one end of pitch line 6 after which thimble 7 is placed over the end of line 6 and fastened thereto with hot solder. Thus said pitch line is connected to said clevis and can rotate therein. The other end of pitch line 6 is inserted in the swivel eye 9 on the shank of pitch-line hook 12 and has thimble 10 soldered thereon, thus fastening the other end of said pitch line in a swiveling manner to said pitch-line hook. A transverse hole 15 large enough to permit said thimbles to pass is formed in the swivel end of shank 10 and a slot 14 is extended from said hole through the length of the back 12 of said hook and into the hook end 13 to near the end of the same. The walls of said hole 15 are shown at 11 and connect the upper part of the shank 8 with its lower bifurcated part and back of hook 12. The solid hook point 13 terminates the lower end of slot 14. The upper end of choker cable 16 is fitted with thimble 17 soldered thereon. In engaging the choker cable with the pitch-line hook said thimbled end is passed through hole 15, as at 17', carried downward till the cable strikes hook end 13 when the cable is withdrawn till said thimble strikes the back of the hook and then the cable is turned downward till said thimble is seated in the hook, as shown at 17, with said cable bearing against the end of slot 14 in said hook. The front walls of 12 are extended by lugs a12, a12, above the end of the hook to constrict the entrance into the hook and form a pocket into which thimble 17 may enter and with which it may engage when the cable is slackened, while in use, to prevent disengagement of the cable from the hook. The other end of the choker cable is shown at a16 and on it is fixed thimble 18 shown as engaged, together with said cable end, in choker hook 20. Between the ends 16 and a16 of said cable the larger part of the same is shown in Fig. 1 as broken away. There is enough of the broken-away loop to encircle the largest log to be hauled. The eye of the choker hook is shown at 22, 23, in which cable 16 has been engaged before both of thimbles 17 and 18 have been fixed thereon. The walls 19 of a transverse hole 24 in the shank of the choker hook connect with the bifurcated back of the hook 20, 20 between which is slot 22 extending through the point of the hook 21 to near the end of the same. The lower end of the choker cable is engaged with the hook by passing thimble 18 and cable end a16 through hole 24, as at 18', a16', then said cable end is passed through slot 22 till the cable strikes hook end 21 when the cable is withdrawn till thimble 18 enters the hook, as at 18'', when the cable is turned about the hook to occupy the position shown at a16, 18 with said thimble seated in said hook and said cable in the hook slot and against the solid end of said hook. The front walls of 20, 20 are extended opposite the end of the hook by lugs a20, a20 to constrict the entrance into the hook and form a pocket which thimble 18 may enter and in which it may engage to prevent the cable from disengaging from the hook when it slackens during use.

To disengage the choker cable from the choker hook slack in the cable is provided and cable end a16 is carried backward in slot 22 till thimble 18 can be passed out of the hook between lugs a20 and the hook end when it is passed to position shown at a16', 18' and withdrawn through hole 24. To disengage cable end 16 from pitch line hook 12 cable end 16 is carried backward in said hook and thimble 17 is passed forward between the hook end and lugs a12, a12 and then carried upward to the position 16', 17' when it can be withdrawn through hole 15.

As described and illustrated, the hooks of my choker rigging engage with the cables in a manner to insure against their disengagement during use and yet they are easily disengaged when so desired if sufficient slack in the cable is available; the forms of the fixtures shown are not difficult to mold, and the use of the thimbles saves some length of heavy and expensive cables as compared to the spliced eyes usually employed for engagement with the ordinary logging hooks.

Having thus disclosed my invention, what I claim is new and desire to secure by Letters Patent is,—

1. In a logging choker rigging in combination, a swivel clevis; a pitch-line hook having a swivel eye and a slotted hook, said hook slot enlarged in the back of said hook to permit the passage of the thimbled end of a choker cable and the remainder of said slot wide enough to permit the passage of said cable only; a slotted choker hook having a cable eye, said hook slot enlarged in the back of said hook to permit the passage of the thimbled end of a choker cable and the remainder of said slot of width to permit the passage of said cable only; a pitch-line cable one end of which is engaged with said clevis swivel by a thimble fixed to said cable end, and the other end of which is engaged with said pitch-line hook swivel by a thimble fixed to said cable end; and a choker cable reeved through said choker hook eye, having a thimble fixed to each end, one end of which is adapted to pass through said pitch-line hook slot enlargement and engage with and disengage from said pitch-line hook, and the other end of which is adapted to pass through said choker hook slot enlargement and engage with and disengage from said choker hook.

2. In a pitch-line hook in combination, a pitch-line hook shank having a swivel eye and a transverse hole adapted for the passage of the thimbled end of a choker cable, a slotted hook back connected to said shank and said slot connecting with said transverse hole, a slotted hook, having a closed end, connected to said hook back and said hook slot connecting with said back slot, and lugs on said hook shank adjacent to and projecting toward said closed hook end.

3. In a logging choker rigging choker hook in combination, a choker hook shank having a cable eye and also having a transverse hole adapted for the passage of the thimbled end of a choker cable, a slotted hook back connected to said shank and said slot connecting with said transverse hole, a slotted hook, having a closed end, connected with said back and said slot connecting with said back slot, and lugs on said hook shank adjacent to and projecting toward said closed hook end.

OSCAR A. WIRKKALA.